Patented Aug. 12, 1941

2,251,983

UNITED STATES PATENT OFFICE

2,251,983

PROCESS FOR MAKING VINYL ESTERS AND OTHER ESTERS OF UNSATURATED ALCOHOLS

Henry C. Chitwood, Charleston, W. Va., assignor to Carbide and Carbon Chemicals Corporation, a corporation of New York No Drawing. Application April 25, 1940, Serial No. 331,603

18 Claims. (Cl. 260—491)

Since Klatte (U. S. 1,084,581) first proposed the synthesis of vinyl esters from acetylene and carboxylic acids in the presence of mercury salts, no commercially feasible process for the production of these compounds has appeared which has not utilized the basic reaction invented by this chemist.

According to the present invention, vinyl esters, as well as esters of other unsaturated alcohols, are prepared by the pyrolysis of carboxylic acid diesters of alkylene glycols having at least one primary hydroxyl group. The reaction gives rise to the free carboxylic acid as well as the desired ester of an unsaturated alcohol. Diesters of alkylene glycols such as ethylene glycol, propylene glycol, 1,3 butylene glycol, 1,3 amylene glycol and like glycols may be employed. Of this series, diesters of the alkylene glycols containing three or more carbon atoms are somewhat more readily pyrolized than those of ethylene glycol.

The position of the double bond in the alcohol part of the molecule depends upon the number of carbon atoms in the alkylene glycol used. Diesters of ethylene glycol yield vinyl esters on pyrolysis, and diesters of alkylene glycols containing three or more carbon atoms are converted to esters of allyl alcohol or of substituted allyl alcohols. The types of reaction possible may be illustrated by the three following examples:

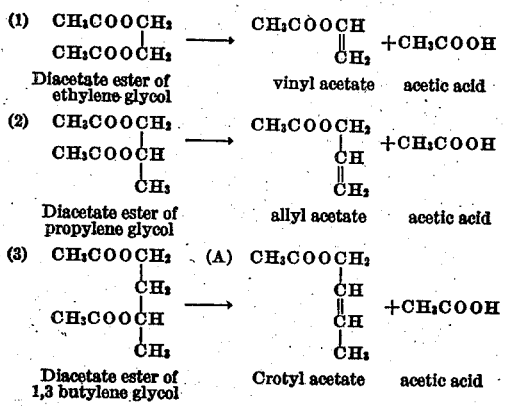

and

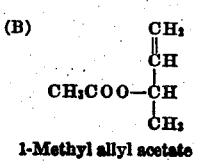

The process applies to diesters of alkylene glycols with aromatic as well as with aliphatic carboxylic acids. Suitable aromatic acids for forming such esters include benzoic, toluic, napthoic, and phthalic acids. In the series of ethylene glycol diesters containing aliphatic acid groups, higher yields of vinyl ester are obtained with diacetates than with dipropionates, and the yields appear to decrease as the number of carbon atoms in the acid group increases. The invention does not apply to alkylene glycol diformates, for these compounds do not yield unsaturated esters on pyrolysis. Alkylene glycol diesters of the aliphatic acids containing from 2 to 10 carbon atoms, such as crotonic, butyric, pentanoic, hexoic, heptoic, 2-ethyl hexoic, octoic and like acids, are, therefore, a class to which the invention particularly applies.

The pyrolysis may be carried out either in the vapor phase or in the liquid phase. However, operation in the vapor phase is preferred, thereby avoiding the necessity of maintaining the alkylene glycol diester under pressure to attain the required pyrolysis temperatures. Certain alkylene glycol diesters, such as ethylene glycol dibenzoate, have a sufficiently high boiling point to permit pyrolysis in the liquid phase at atmospheric pressure and this has been accomplished with good yields in the case of vinyl benzoate. The pyrolysis of other esters of lower boiling point can be conducted in the liquid phase if sufficient pressure is applied to cause the alkylene glycol diester to remain liquid at the temperature of pyrolysis.

Side reactions may occur in the pyrolysis of the alkylene glycol diester, and these side reactions come into greater prominence as the extent of pyrolysis increases. By extent of pyrolysis, or conversion, is meant the fraction of the total alkylene glycol diester which is transformed to all other materials. Since the efficiency, expressed as the molar ratio of unsaturated ester produced to the total amount of alkylene glycol diester decomposed, is higher when the extent of pyrolysis is low, it is generally desirable to operate in such a manner that only about 20% to 50% of the total alkylene glycol diester is converted per pass.

The pyrolysis is ordinarily carried out by passing the vaporized diester through a heated reaction zone which may contain catalysts or inert filling materials, or may be empty. If desired, an inert diluent such as nitrogen may be mixed with the vaporized diester prior to its pyrolysis. The temperature to be used in operation may vary between about 250° C. and about 700° C. and depends to some extent upon the means selected for conducting the reaction. If catalysts are employed, temperatures ranging from about 250° to about 400° C. may be used, the upper range of temperature being preferred when using relatively high space velocities and vice versa. Examples of catalysts which promote the desired pyrolysis are activated alumina, vanadium and molybdenum oxides, magnesium pyrophosphate, and zinc acetate.

If no catalysts are employed, somewhat higher temperatures, ranging from about 350° to about 700° C. are desirable, the upper range of temperatures being more suitable when relatively high space velocities are employed and conversely the lower range of temperatures is preferred when operating at low space velocities. Also, in this range, somewhat higher temperatures are preferred if an inert filling material is present in the reaction chamber. Typical of such materials are crushed sandstone, silica filter stone and ceramically bonded fused aluminum oxide. It is preferred to operate in the presence of such inert materials since they appear to inhibit the formation of undesirable products through side reactions. Carrying out the reaction in the presence of a catalyst is the least favored of the three methods, despite the fact that lower temperatures may be used, since most known catalysts for the reaction are somewhat lacking in selectivity and catalyze, as well, side reactions which lead to the formation of other products besides the desired esters of unsaturated alcohols.

As indicated previously, pyrolysis of the carboxylic acid diester of the alkylene glycol will lead to the formation of one mol of the free acid per mol of the unsaturated alcohol ester produced. To take the pyrolysis of ethylene glycol diacetate as typical, the invention includes the separation of the formed vinyl acetate from the acetic acid, for example, by distillation, and the recycling of the acetic acid to react with ethylene glycol or ethylene oxide to form additional glycol diacetate which is then fed to the reaction chamber. Any unconverted glycol diacetate may also be recovered and introduced with fresh material into the reaction zone. When the invention is applied to the pyrolysis of other alkylene glycol diesters, it is understood that the appropriate alkylene glycol or olefine oxide would be used to react with the recycled carboxylic acid.

The examples to follow describe several features of the invention and are intended to illustrate the principles previously discussed.

*Example 1*

This example is to illustrate the embodiment of the invention in which the pyrolysis is carried out in an unpacked tube in the absence of a catalyst. The apparatus employed consisted of an electrically heated, hardened glass tube one inch in diameter and about three feet long. The initial one-third of the tube was packed with inert filling material to vaporize and to preheat the glycol diester fed to the reaction zone. The temperature was measured by means of a thermocouple and the temperature reported, in this and in the following examples, is the average temperature during the run. Since the temperature varied a few degrees throughout the reaction tube, the thermocouple well was placed at the point of maximum temperature. Of the effluent reaction products, those which were liquid were condensed and those which were permanent gases and passed a condenser and a cold trap were measured.

Under the above conditions, 1092 grams of ethylene glycol diacetate were introduced to the preheater section of the tube at the rate of 50 cubic centimeters of liquid per hour. The maximum temperature of the reaction zone was maintained at approximately 550° C. At the end of the run, 881 grams of liquid products were condensed, or liquefied in the cold trap, and 119 liters of permanent gases were evolved. The analysis of these gases showed they contained carbon dioxide 6%, olefines 7%, and carbon monoxide 73%. The composition of the liquid products is tabulated below:

| | Grams |
|---|---|
| Vinyl acetate | 128 |
| Acetone | 171 |
| Acetic acid | 372 |
| Ketene | 2 |
| Acetaldehyde | 25 |
| Acetic anhydride | 25 |
| Recovered glycol diacetate | 158 |

On the basis of these results, the overall conversion was 86% and the overall yield of vinyl acetate was 20%. It is apparent that, in this example, the temperature was somewhat high in proportion to the space velocity since the great extent of pyrolysis, as measured by the percentage conversion, was accompanied by a low yield of vinyl acetate. Consequently, a somewhat low efficiency of 23% was obtained.

*Example 2*

The previous experiment was repeated in the same apparatus and in the same manner, with the exception that a lower temperature of about 525° C. was employed and that 1098 grams of ethylene glycol diacetate were subjected to pyrolysis. That this temperature was more suitable for the space velocity involved is shown by the facts that only 49 liters of gases were produced and that the quantity of products of side reactions was materially diminished, the composition of the condensate being indicated below:

| | Grams |
|---|---|
| Vinyl acetate | 170 |
| Acetone | 86 |
| Acetic acid | 247 |
| Acetic anhydride | 3 |
| Acetaldehyde | 15 |
| Ketene | 4 |
| Recovered glycol diacetate | 470 |

The above figures represent an overall conversion of 57%, an overall yield of vinyl acetate of 26%, and an efficiency of 46%.

*Example 3*

In this experiment the reaction tube was packed throughout its entire length with size 4 to 8 mesh particles of ceramically bonded fused aluminum oxide. The maximum temperature of the reaction zone was maintained at 525° C. and 1106 grams of ethylene glycol diacetate were introduced at the rate of 100 cubic centimeters of liquid per hour. That this embodiment of the invention is superior to the other two in its inhibition of side reactions is shown by the facts that only 16 liters of gas were evolved and that, although the overall yield of vinyl acetate was only 23%, the efficiency of its production was 66%. The actual composition of the condensate is tabulated below:

| | Grams |
|---|---|
| Vinyl acetate | 149 |
| Acetone | 27 |
| Acetic acid | 163 |
| Acetaldehyde | 7 |
| Recovered glycol diacetate | 724 |

Example 4

The purpose of this example is to show the correlation between the temperature of the reaction zone and the space velocity of the reactant vapors. Accordingly, the feed rate of the glycol diester was increased to 200 cubic centimeters of liquid per hour, thus doubling the space velocity, and the temperature was correspondingly raised to 540° C. Conditions were otherwise identical to those described in the previous example, with the immaterial exception that 1096 grams of glycol diacetate were reacted.

Because compensating changes were made in the reaction conditions, almost identical results were obtained; 12 liters of gas being given off and vinyl acetate obtained in a yield of 23% and at an efficiency of 68%. The actual composition of the products obtained was as follows:

| | Grams |
|---|---|
| Vinyl acetate | 148 |
| Acetone | 25 |
| Acetic acid | 152 |
| Acetaldehyde | 2 |
| Recovered glycol diacetate | 724 |

Example 5

The pyrolysis of ethylene glycol dipropionate was carried out in an electrically heated glass tube packed with ceramically bonded alumina. The liquid was fed from a dropping funnel at a rate of 50 cc. per hour. Quantitative runs were made at 550° and 560° C. and the approximate amounts of products obtained in each case were:

| | Temperature, °C. | |
|---|---|---|
| | 550 | 560 |
| Ethylene glycol dipropionate fed, gms | 525 | 666 |
| Gas evolved, liters | 11.5 | 21 |
| Aldehydes, gms | 8 | 5 |
| Methyl ethyl ketone, gms | 16 | 45 |
| Vinyl propionate, gms | 63 | 91 |
| Propionic acid, gms | 83 | 139 |
| Ethylene glycol dipropionate recovered, gms | 289 | 294 |
| Overall yield, vinyl propionate, percent | 21 | 24 |
| Efficiency of vinyl propionate production, percent | 47 | 43 |

Example 6

Two hundred forty-two grams of ethylene glycol dibenzoate were destructively distilled through a short column at a rate necessary to maintain the head temperature at 220° to 245° C. The liquid products of pyrolysis were condensed and the gases passing a trap cooled by solid carbon dioxide and acetone were measured. During 2.3 hours of boiling, the kettle temperature rose from 360° to 425° C. At the end of this period, 211 grams of product had been condensed, 5 grams of volatile liquid were obtained in the cold trap, 17 grams of tarry residue remained in the kettle and 6.1 liters of gas were evolved. The vinyl benzoate and benzoic acid were separated by distillation. After taking off a small heads cut, vinyl benzoate distilled at 89° to 95° C. at 15 mm. The total amount of vinyl benzoate obtained was 87 grams, which corresponds to a yield of 66%. Ninety-two percent of the theoretical amount of benzoic acid obtainable was recovered.

Example 7

An experiment on the pyrolysis of propylene glycol diacetate was conducted in the same general manner as in Example 5. However, in this instance, the pyrolytic chamber consisted of a one-inch stainless steel pipe, containing a concentric thermocouple core of one-eighth inch stainless steel pipe. The annular space was packed with granules of porous ceramically bonded silica. The tube was electrically heated for a length of three feet. The liquid fed was vaporized in the upper section of the tube and then passed through a zone which was held at a pyrolytic temperature.

Propylene glycol diacetate was fed to the pyrolysis zone at a rate of 50 cc. per hour until a total of 340 grams had been introduced. The temperature was 472° C. A distillation and analysis of the condensate showed the presence of 13.4 grams of propionaldehyde, 58.4 grams of allyl acetate, 44.9 grams of acetic acid, and 174 grams of unchanged propylene glycol diacetate. The overall yield of allyl acetate was 27.5% and its efficiency of production 56.3%. The allyl acetate may be hydrogenated readily to propyl acetate, which is of interest as a solvent of intermediate boiling point between ethyl and butyl acetates.

Example 8

1,3 butylene glycol diacetate was pyrolyzed in the same stainless steel apparatus as used in Example 7. The liquid was fed at a rate of 55 cc. per hour at a temperature of 472° C. Under these conditions the material introduced was 86% pyrolyzed. By distillation and confirmatory analysis the product was found to contain 42 grams of butadiene and 79 grams of unsaturated four-carbon acetate. The unsaturated ester was identified as a mixture of crotyl acetate and 1-methyl allyl acetate in the approximate weight ratio of 3 to 2. The overall yield of the combined esters was 35%. The overall yield of butadiene was also 35%.

It is apparent that further modifications of the reaction conditions, according to the principles herein described, will be obvious to those skilled in the art, and the invention is to be regarded only as defined in the appended claims.

What is claimed is:

1. The process for making carboxylic acid esters of unsaturated alcohols which comprises subjecting a diester of an alkylene glycol having at least one primary hydroxyl group with a carboxylic acid having at least two carbon atoms to pyrolysis, and recovering an ester of an unsaturated alcohol from the pyrolysis products.

2. The process for making carboxylic acid esters of unsaturated alcohols which comprises subjecting a diester of an alkylene glycol having at least one primary hydroxyl group with a carboxylic acid having at least two carbon atoms to pyrolysis at a temperature between about 250° and about 700° C., and recovering an ester of an unsaturated alcohol from the pyrolysis products.

3. Process for making carboxylic acid esters of unsaturated alcohols which comprises subjecting a diester of an alkylene glycol having at least one primary hydroxyl group with a carboxylic acid having at least two carbon atoms to pyrolysis in the presence of a catalyst and at a temperature of about 250° to about 400° C., and recovering an ester of an unsaturated alcohol from the pyrolysis products.

4. Process for making carboxylic acid esters of unsaturated alcohols which comprises subjecting a diester of an alkylene glycol having at least one primary hydroxyl group with a carboxylic acid having at least two carbon atoms to pyrolysis in the presence of an inert filling material and at a temperature of about 350° to about 700° C., and recovering an ester of an unsaturated alcohol from the pyrolysis products.

5. Process for making vinyl esters of carboxylic acids other than formic which comprises subjecting the vapors of a diester of ethylene glycol with a carboxylic acid to pyrolysis, and recovering a vinyl ester from the pyrolysis products.

6. Process for making vinyl esters of aliphatic acids which comprises subjecting the vapors of a diester of ethylene glycol with an aliphatic acid having from 2 to 10 carbon atoms to pyrolysis, and recovering a vinyl ester from the pyrolysis products.

7. Process for making vinyl esters of aliphatic acids which comprises subjecting the vapors of a diester of ethylene glycol with an aliphatic acid having from 2 to 10 carbon atoms to pyrolysis at a temperature between about 250° and about 700° C., and recovering a vinyl ester from the pyrolysis products.

8. Process for making vinyl esters of aliphatic acids which comprises subjecting the vapors of a diester of ethylene glycol with an aliphatic acid having from 2 to 10 carbon atoms to pyrolysis in the presence of a catalyst and at a temperature of about 250° to about 400° C., and recovering a vinyl ester from the pyrolysis products.

9. Process for making vinyl esters of aliphatic acids which comprises subjecting the vapors of a diester of ethylene glycol with an aliphatic acid having from 2 to 10 carbon atoms to pyrolysis in the presence of an inert filling material and at a temperature of about 350° to about 700° C., and recovering a vinyl ester from the pyrolysis products.

10. Process for making the acetate esters of unsaturated alcohols having from 2 to 4 carbon atoms which comprises subjecting the vapors of the acetic acid diester of an alkylene glycol having from 2 to 4 carbon atoms to pyrolysis at a temperature between about 250° and about 700° C. and recovering the acetate ester of said unsaturated alcohols from the pyrolysis products.

11. Process for making vinyl acetate which comprises subjecting the vapors of ethylene glycol diacetate to pyrolysis at a temperature between about 250° and about 700° C., and recovering vinyl acetate from the pyrolysis products.

12. Process for making crotyl acetate and 1-methyl allyl acetate which comprises subjecting the vapors of 1,3 butylene glycol diacetate to pyrolysis at a temperature between about 250° and about 700° C., and recovering crotyl acetate and 1-methyl allyl acetate from the reaction products.

13. Process for making carboxylic acid esters of unsaturated alcohols which comprises subjecting the vapors of a diester of an alkylene glycol having at least one primary hydroxyl group with a carboxylic acid having at least two carbon atoms to pyrolysis at a temperature of about 250° to about 700° C., recovering from the pyrolysis products an ester of an unsaturated alcohol as well as a carboxylic acid corresponding to an acyl group of said diester, recycling said recovered acid and causing it to react with one of the group consisting of olefine oxides and alkylene glycols having at least one primary hydroxyl group to form said alkylene glycol diester, and introducing the formed alkylene glycol diester to the pyrolysis reaction.

14. Process for making carboxylic acid esters of unsaturated alcohols which comprises subjecting the vapors of a diester of an alkylene glycol having at least one primary hydroxyl group with a carboxylic acid having at least two carbon atoms to pyrolysis in the presence of a catalyst and at a temperature of about 250° to about 400° C., recovering from the pyrolysis products an ester of an unsaturated alcohol as well as a carboxylic acid corresponding to an acyl group of said diester, recycling said recovered acid and causing it to react with one of the group consisting of olefine oxides and alkylene glycols having at least one primary hydroxyl group to form said alkylene glycol diester, and introducing the formed alkylene glycol diester to the pyrolysis reaction.

15. Process for making carboxylic acid esters of unsaturated alcohols which comprises subjecting the vapors of a diester of an alkylene glycol having at least one primary hydroxyl group with a carboxylic acid having at least two carbon atoms to pyrolysis in the presence of an inert filling material and at a temperature of about 350° to about 700° C., recovering from the reaction products an ester of an unsaturated alcohol as well as a carboxylic acid corresponding to an acyl group of said diester, recycling said recovered acid and causing it to react with one of the group consisting of olefine oxides and alkylene glycols having at least one primary hydroxyl group to form said alkylene glycol diester, and introducing the formed alkylene glycol diester to the pyrolysis reaction.

16. Process for making vinyl acetate which comprises subjecting the vapors of ethylene glycol diacetate to pyrolysis at a temperature of about 250° to about 700° C., recovering vinyl acetate and acetic acid from the reaction products, recycling the recovered acetic acid and causing it to react with one of the group consisting of ethylene oxide and ethylene glycol to form ethylene glycol diacetate, and introducing the formed ethylene glycol diacetate to the pyrolysis reaction.

17. Process for making vinyl esters of aromatic carboxylic acids which comprises subjecting a diester of ethylene glycol with an aromatic carboxylic acid to pyrolysis in the liquid phase, and recovering the formed vinyl ester from the pyrolysis products.

18. Process for making vinyl esters of aromatic carboxylic acids which comprises subjecting a diester of ethylene glycol with an aromatic carboxylic acid to pyrolysis in the liquid phase at a temperature of about 250° C. to about 700° C., and recovering the formed vinyl ester from the pyrolysis products.

HENRY C. CHITWOOD.